United States Patent [19]

Hooykaas

[11] Patent Number: 5,457,272

[45] Date of Patent: Oct. 10, 1995

[54] METHOD FOR CAPTURING ECOLOGICALLY HARMFUL SUBSTANCES FROM MATERIAL POLLUTED WITH SUCH SUBSTANCES

[75] Inventor: Carel W. J. Hooykaas, Rotterdam, Netherlands

[73] Assignee: Pelt & Hooykaas B.V., Netherlands

[21] Appl. No.: 250,788

[22] Filed: May 27, 1994

[30] Foreign Application Priority Data

May 27, 1993 [NL] Netherlands ............... 9300910
Nov. 5, 1993 [NL] Netherlands ............... 9301919

[51] Int. Cl.$^6$ ........................................ B09B 5/00
[52] U.S. Cl. .................. 588/250; 588/249; 210/909; 423/118.1; 502/84
[58] Field of Search .............. 502/84; 423/118.1; 210/909; 588/249, 250; 405/128, 129

[56] References Cited

U.S. PATENT DOCUMENTS

| | | | |
|---|---|---|---|
| 4,271,043 | 7/1981 | Vaughan et al. | 252/184 |
| 4,436,832 | 3/1984 | Jacobs et al. | 502/84 |
| 4,579,832 | 4/1986 | Shabtai et al. | 502/84 |
| 4,621,070 | 11/1986 | Pinnavaia et al. | 502/63 |
| 4,629,713 | 12/1986 | Suzuki et al. | 502/84 |
| 4,717,560 | 1/1988 | Vaughan | 423/712 |
| 4,740,488 | 4/1988 | Fogler et al. | 502/84 |
| 5,200,378 | 4/1993 | Clearfield | 502/62 |
| 5,362,770 | 11/1994 | Palmer et al. | 523/200 |
| 5,393,718 | 2/1995 | Skeels et al. | 502/66 |

*Primary Examiner*—John A. Ricci
*Attorney, Agent, or Firm*—Levine & Mandelbaum

[57] ABSTRACT

A method is described for capturing ecologically harmful substances, both of organic and inorganic nature, by absorbing these substances on a zeolite or on a swellable, layered clay which has been modified with hydroxyaluminium to form an aluminium-rich zeolite or a pillared clay containing pillars of aluminium hydroxide complexes, the aluminium-rich zeolite or aluminium-pillared cationic or anionic clay having been treated, prior to the absorption, with a salt of an inorganic acid, preferably with a phosphate. If the treatment is carried out with a salt of a rare earth element, superpillars are formed in the clay, as a result of which a clay having a great absorbency in addition to a large rate of flow is obtained. By treating the pillared clay with a quaternary ammonium compound, a doubly modified clay is formed which is exceedingly suitable for treating material which has been polluted with a combination of organic and inorganic ecologically harmful substances, and in particular polluted with heavy metals.

11 Claims, No Drawings

5,457,272

METHOD FOR CAPTURING ECOLOGICALLY HARMFUL SUBSTANCES FROM MATERIAL POLLUTED WITH SUCH SUBSTANCES

BACKGROUND OF THE INVENTION

The invention relates to a method for capturing ecologically harmful organic and inorganic substances from a material polluted with such substances, by absorbing said substances on a zeolite or on a swellable, layered clay, which are modified with hydroxyaluminium to form an aluminium-rich zeolite or a pillared clay having pillars of aluminium hydroxide complexes.

Such a method is disclosed by U.S. Pat. No. 4,740,488. It should be noted, however, that the aluminium-pillared clay formed in this known method, in particular aluminium-pillared cationic clay, is used as an absorbent to remove only traces of organic pollutants from industrial effluents.

SUMMARY OF THE INVENTION

A method has now been found, by virtue of which such an aluminium-rich zeolite or an aluminium-pillared cationic or anionic clay is suitable for absorption of organic and inorganic compounds, and in particular for heavy metals such as chromium, nickel, copper, zinc, silver, cadmium, mercury and lead.

The method according to the invention is characterised in that, prior to the absorption of the organic and inorganic substances, the aluminium-rich zeolite or the aluminium-pillared, cationic or anionic clay is treated with a salt of an inorganic acid. This treatment can be carried out in a simple manner, specifically by flushing the aluminium-rich zeolite or the aluminium-pillared clay with an aqueous solution of the desired salt. This results in the aluminium of the zeolites or the aluminium of the clay structures and the aluminium pillars between the clay layers being coated, as it were, with a layer of the acid groups of the salt employed. A beneficial side effect of this treatment was observed in that porous aluminium-rich zeolite,-but in particular the treated aluminium-pillared clay having a large spacing of approximately 10 Å between the clay layers, has many active acid groups, while the free pores in the structures remain virtually unchanged. As a result, a high rate of flow is possible if, for example, heavy metals have to be absorbed from an industrial effluent stream. Incidentally, the zeolite material treated according to the invention, and the processed and modified clay material is not restricted to absorbing and fixing materials in trace quantities; effluents containing larger amounts of pollutants can likewise be treated expediently.

The salt used of an inorganic acid is preferably a sulphate, sulphite, nitrate, nitrite, phosphate, phosphite, carbonate, chlorate and/or chloride. It was found that if a phosphate was used, it was possible to increase the interlamellar spacing between the clay layers up to 15–18 Å.

Surprisingly, we have found that a modified clay containing aluminium superpillars can be produced, if the salt used of the abovementioned type is a salt of a rare earth metal, and in particular a cerium salt, preferably cerium phosphate, during the modifying pillaring treatment.

It should be noted that the term superpillars is used to designate a layered, pillared clay, both cationic and anionic, having a very large layer spacing, up to approximately 25 Å. It is assumed that the superpillars which are responsible for this large layer spacing, have been formed by coupling of aluminium complexes under influence of cerium which in the process may play a part as a complexing agent. It will be evident that such a material will have an even greater rate of flow, together with a great absorbency or binding capacity, especially with the salt coating mentioned hereinabove. As a result, it is possible to capture the inorganic pollutants present in a medium, very rapidly and completely, over a period of from a few minutes to a few hours, from the medium by absorbing and fixing them.

According to a very expedient embodiment of the method according to the invention, a cationic or anionic pillared clay is used which is additionally modified with an organic, quaternary ammonium compound or an organic carboxylic acid derivative, respectively. It should be noted that, owing to pillar formation between the clay layers being controlled, not all the sodium, potassium and/or calcium ions or carbonate and/or chloride ions present in the layered clay mineral will have disappeared. By then exchanging said sodium, potassium and/or calcium ions or carbonate and/or chloride ions still present for a quaternary ammonium group and carboxylic acid derivatives, respectively, the clay matrix at those sites changes from hydrophilic to strongly hydrophobic. The quaternary ammonium compound used can be an alkyl ammonium compound or an alkyl-phenyl ammonium compound, in particular dimethyldidodecylammonium chloride or trimethylphenylammonium chloride, it being possible to increase the clay layer spacing to 26 Å in the process. The carboxylic acid derivative employed can be an oxalate, malonate, succinate, adipate or a sebacate group, it being possible to increase the clay layer spacing to 20 Å in the process. Of course, the invention is not limited to these compounds; possible alternatives which can be used include phenyldimethyldodecylamine compound or hexadecyltrimethylammonium bromide, respectively, or even an organic phosphate or nitro compound.

The locally strongly hydrophobic character of the pillared clay makes it possible to absorb effectively organic compounds, in particular aromatic compounds such as benzene, phenol, chlorophenyl compounds, chloronaphthalene, PCBs, dioxins, dibenzofurans and the like.

It was found, surprisingly, that even the large absorbed organic compounds could effectively no longer be leached; this is probably due to the presence of the (aluminium) pillars which have an inhibiting effect on the potential mobility of large organic molecules which are bound weakly to the untreated clay matrix.

The previously pillared clay modified with a quaternary ammonium compound or carboxylic acid derivative, respectively, is suitable, as described hereinabove, owing to its double modification, for capturing by absorption a combination of chemical compounds of an organic and inorganic nature. Such a combination of pollutants is encountered, for example, in a waste tip or dredged mud. Hitherto it has only been possible to render such a material harmless by a combination of different absorbing materials. The invention overcomes this problem by employing specifically prepared, doubly modified clay material, coated, if necessary, with salt.

Preference is given to the use, as a swellable, layered clay, of a cationic clay such as a smectite, or as an anionic clay, of hydrotalcite. The smectite clay used, in particular, is a montmorillonite, hectorite, beidellite, bentonite or saponite. The hydrotalcite clay used is pyroaurite, igelstromite, meixnerite, hydrocalumite or hydrotalcite. Surprisingly, it was found, when such clay materials which according to the invention had been doubly modified were used that coupling of the clay layers occurs in such a way that a terminal end of a part of a layered clay material is joined, by Van der Waals forces, to the outermost layer of another particle of clay mineral etc. Thus cross-linking takes place, as it were, of the clay material present, mesopores being formed in the process. Said coupling of the particles of clay mineral has the result, on the one hand, that the compounds absorbed between the layers of the clay mineral are locked in, as a result of which desorption thereof is considerably impeded, while, on the other hand, mesopores are formed which form additional sites for the absorption or occlusion of material.

The invention further relates to an aluminium-pillared, layered, cationic or anionic clay material which has been modified with a quaternary ammonium compound or carboxylic acid derivative and has been treated with a rare earth metal salt, in particular cerium phosphate, and is suitable for use in the method according to the invention.

It should be noted that the clay doubly modified according to the invention may be used, inter alia, in isolating and sealing techniques and in the case of immobilisation. In isolation and sealing techniques, a source of pollution in the soil or a waste tip are separated from the environment using, respectively, vertical and/or horizontal walls. Such walls may consist of clay or a sand-clay mixture. By incorporating in the material of the partition wall a clay doubly modified according to the invention, the clay wall will completely intercept the pollutants present and thus prevent the transfer of the substance into the environment. In the case of immobilisation, the modified clay material, on which the organic and inorganic material has been absorbed, is also mixed with an inorganic hydraulic binder and is set, possibly with the addition of water. The binder used in the process is usually Portland cement, fly ash, limestone and/or granulated blast furnace slags. Such techniques are already known per se, incidentally.

DESCRIPTION OF THE PREFERRED EMBODIMENTS

EXAMPLE I

A quantity of sodium calcium montmorillonite in the form of hectorite was dispersed in distilled water by means of stirring for 5 hours, using a magnetic stirrer. The expanded clay thus obtained was then brought into contact with an hydroxyaluminium solution to form an aluminium-pillared clay, an amount of pillar-forming solution required to achieve an aluminium/montmorillonite ratio of 20 mmol/g of montmorillonite being added to the vigorously stirred dispersion. The product thus obtained was left to stand for 1 hour. It was then centrifuged, washed by redispersing in distilled water and again centrifuged. This procedure was repeated a few more times.

The aluminium-pillared clay obtained was then flushed with a solution of cerium phosphate and centrifuged.

X-ray diffraction analysis of the pillared clay thus obtained showed that the interlamellar spacing between the clay layers was 19 Å.

It should be noted, for comparison, that the interlamellar spacing of the untreated sodium calcium hectorite is approximately 10 Å.

Hectorite clay, modified as specified hereinabove, was then tested with a solution of cadmium, lead, copper and zinc salts. These salts were completely absorbed in the pillared hectorite clay in approximately 30 minutes and could then no longer be detected in the treated solution.

EXAMPLE II

The starting material was an aluminium-pillared hectorite clay treated with cerium phosphate, as prepared according to example I.

The clay thus modified was then treated with trimethylphenylammonium chloride, alkylammonium groups being exchanged for the sodium and calcium ions still present in the clay matrix.

After the exchange, the doubly modified clay was thoroughly washed with water and freeze-dried.

The hectorite clay obtained was then treated with a solution which, in addition to chromium and mercury compounds, also contained phenol. Both the heavy metals and the phenol were completely absorbed and could no longer be detected in the treated solution.

If modification with the alkylammonium compound was omitted, phenol was indeed absorbed, probably by being locked up in mesopores formed, but to a much lesser extent than when the clay matrix modified with alkylammonium compound was used.

It should be noted that a clay matrix doubly modified according to the invention can be used as such in the purification of industrial waste water which contains a combination of pollutants, but also, for example, in a clay wall to segregate a particular area and thus prevent further pollution of the environment. If desired, the doubly modified clay containing pollutants thus obtained can be incorporated in a cement matrix, in a conventional manner. It will be evident that the absorbed compounds could no longer be extracted from the set product thus obtained.

What is claimed is:

1. A method for capturing ecologically harmful organic and inorganic substances from a material polluted with such substances, by absorbing said substances on a zeolite or on a swellable, layered clay, which zeolite or clay are modified with hydroxyaluminium to form an aluminium-rich zeolite or a pillared clay having pillars of aluminium hydroxide complexes, wherein, prior to the absorption of the organic and inorganic substances, said aluminium-rich zeolite or said pillared clay is treated with a salt of an inorganic acid.

2. A method according to claim 1, wherein the salt used of an inorganic acid is selected from the group consisting of a sulphate, sulphite, nitrate, nitrite, phosphate, phosphite, carbonate, chlorate and chloride.

3. A method according to claim 2, wherein said salt used of an inorganic acid is a phosphate.

4. A method according to claim 1, wherein the salt used is a salt of a rare earth metal.

5. A method according to claim 4, wherein said salt used is a cerium salt.

6. A method according to claim 1, wherein a pillared clay is used which is further also modified with a quaternary ammonium compound.

7. A method according to claim 6, wherein the quaternary ammonium compound used is selected from the group consisting of an alkyl ammonium compound and an alkylphenyl ammonium compound.

8. A method according to claim 6, wherein the quaternary ammonium compound is selected from the group consisting of dimethyldidodecylammonium chloride or trimethylphenylammonium chloride.

9. A method according to claim 1, wherein the swellable, layered clay used is a smectite clay.

10. A method according to claim 9, wherein the smectite clay used is selected from the group consisting of a montmorillonite, hectorite, beidellite, bentonite and saponite.

11. An aluminium-pillared, layered, cationic or anionic clay material modified with a quaternary ammonium compound and being treated with a rare earth metal salt, in particular cerium phosphate, suitable for use in the method for capturing ecologically harmful organic and inorganic substances according to claim 1.

\* \* \* \* \*